(12) United States Patent
Putman

(10) Patent No.: US 7,891,676 B1
(45) Date of Patent: Feb. 22, 2011

(54) PORTABLE UTILITY TRANSPORT

(76) Inventor: Bruce Clark Putman, 785 Rowland Rd., Leonard, MI (US) 48367

( * ) Notice: Subject to any disclaimer, the term of this patent is extended or adjusted under 35 U.S.C. 154(b) by 0 days.

(21) Appl. No.: 12/379,633

(22) Filed: Feb. 25, 2009

Related U.S. Application Data

(63) Continuation of application No. 12/230,888, filed on Sep. 6, 2008, now abandoned.

(60) Provisional application No. 60/972,899, filed on Sep. 17, 2007.

(51) Int. Cl.
*B62B 3/02* (2006.01)
(52) U.S. Cl. .................................. 280/47.17; 280/652
(58) Field of Classification Search .................. 280/10, 280/13, 30, 33.997, 638–659, 43.1, 87.01, 280/47.131, 47.17–47.19, 47.34, 62–64
See application file for complete search history.

(56) References Cited

U.S. PATENT DOCUMENTS

| | | | | |
|---|---|---|---|---|
| 1,052,953 A * | 2/1913 | Pierce | ......................... | 105/143 |
| 2,416,492 A * | 2/1947 | Neeley | ...................... | 280/47.3 |
| 2,429,028 A * | 10/1947 | Neeley | ...................... | 280/47 |
| 2,636,748 A * | 4/1953 | Giovannoni | ............... | 280/47.3 |
| 2,869,661 A * | 1/1959 | Fernandez | ................ | 180/19.1 |
| 2,918,296 A * | 12/1959 | Goodale | ..................... | 280/645 |
| 2,979,338 A * | 4/1961 | Dwyer | ...................... | 280/47.3 |
| 2,992,834 A * | 7/1961 | Tidwell et al. | ............. | 280/47.3 |
| 3,456,959 A * | 7/1969 | Hemphill et al. | ........... | 280/47.3 |
| 3,734,528 A * | 5/1973 | Echols, Jr. | ................... | 280/42 |
| 3,931,985 A * | 1/1976 | Knebel | ........................ | 280/42 |
| 4,055,354 A * | 10/1977 | Sharpe | ..................... | 280/47.31 |
| 4,063,744 A * | 12/1977 | Fraser | ........................ | 280/42 |
| 4,398,736 A * | 8/1983 | De Wijn | ...................... | 280/40 |
| 4,444,405 A * | 4/1984 | Barrus | ....................... | 280/47.3 |
| 4,789,180 A * | 12/1988 | Bell | ........................... | 280/652 |
| 4,863,179 A * | 9/1989 | Isaacs | ................... | 280/33.996 |
| 5,004,263 A * | 4/1991 | Hubbard | ..................... | 280/645 |
| 5,562,299 A * | 10/1996 | Morrissette | ................ | 280/652 |
| 5,562,300 A * | 10/1996 | Nelson | .................... | 280/655.1 |
| 5,620,193 A * | 4/1997 | Dschaak | .................. | 280/47.31 |
| 5,634,221 A * | 6/1997 | McKinney | ..................... | 5/620 |
| 5,820,141 A * | 10/1998 | Wilkerson et al. | ............. | 280/30 |
| 5,853,189 A * | 12/1998 | Swartzlander | .............. | 280/652 |
| 6,042,128 A * | 3/2000 | Dinkins | .................... | 280/47.18 |
| 6,199,508 B1 * | 3/2001 | Miale et al. | ................ | 119/28.5 |
| 6,217,043 B1 * | 4/2001 | Chumley | ..................... | 280/40 |
| 6,260,864 B1 * | 7/2001 | Smith | ....................... | 280/47.26 |
| 6,270,092 B2 * | 8/2001 | Darling, III | .................. | 280/30 |
| 6,283,496 B1 * | 9/2001 | Dickmann | .................. | 280/652 |
| 6,581,945 B1 * | 6/2003 | Shapiro | ....................... | 280/30 |
| 6,685,198 B1 * | 2/2004 | Hartman | ..................... | 280/1.5 |
| 6,729,263 B2 * | 5/2004 | Miale et al. | ................ | 119/28.5 |
| 6,811,179 B2 * | 11/2004 | Woods | ....................... | 280/652 |
| 6,811,180 B1 * | 11/2004 | Molliere | ..................... | 280/652 |
| 6,991,250 B2 * | 1/2006 | Lindsey et al. | ............. | 280/651 |

(Continued)

*Primary Examiner*—J. Allen Shriver, II
*Assistant Examiner*—Jacob Meyer
(74) *Attorney, Agent, or Firm*—Christopher P. Maiorana, PC

(57) ABSTRACT

A portable utility transport adaptable to multiple wheel and axel combinations. The wheelbase is adjustable and the undercarriage is pivotal permitting them to fold under the carrier frame in a stowed orientation. The elongated guidance frame creates a lever utilizing the rolling fulcrum over the front or rear wheels. The guidance frame is pivotally attached to the carrier frame allow it to be laid virtually flat upon the carrier frame.

19 Claims, 4 Drawing Sheets

U.S. PATENT DOCUMENTS

| | | | |
|---|---|---|---|
| 7,172,207 B2* | 2/2007 | Henry | 280/651 |
| 7,547,037 B2* | 6/2009 | Poppinga et al. | 280/651 |
| 2002/0089137 A1* | 7/2002 | Chang et al. | 280/87.041 |
| 2002/0105169 A1* | 8/2002 | Dahl | 280/651 |
| 2003/0205885 A1* | 11/2003 | Woods | 280/652 |
| 2004/0025795 A1* | 2/2004 | Miale et al. | 119/28.5 |
| 2004/0080128 A1* | 4/2004 | Lindsey et al. | 280/30 |
| 2007/0194560 A1* | 8/2007 | Zink | 280/652 |
| 2008/0073871 A1* | 3/2008 | Winkel | 280/415.1 |
| 2008/0217886 A1* | 9/2008 | Poppinga et al. | 280/651 |
| 2008/0284119 A1* | 11/2008 | Williamson | 280/30 |
| 2008/0309039 A1* | 12/2008 | Bailey et al. | 280/47.34 |

* cited by examiner

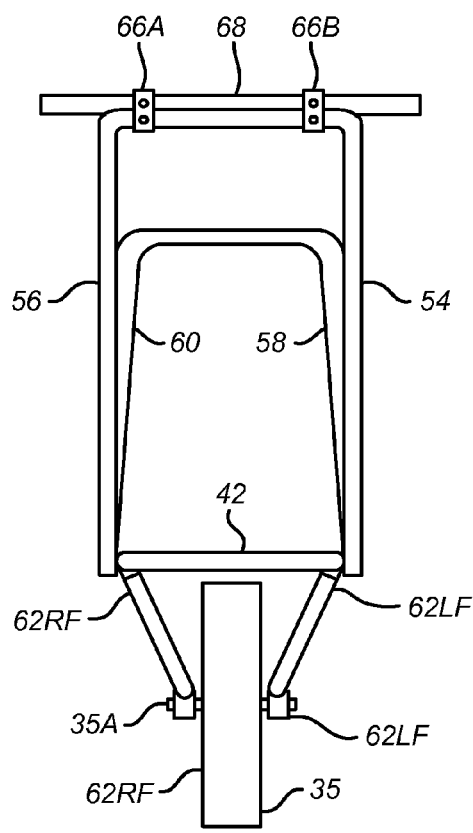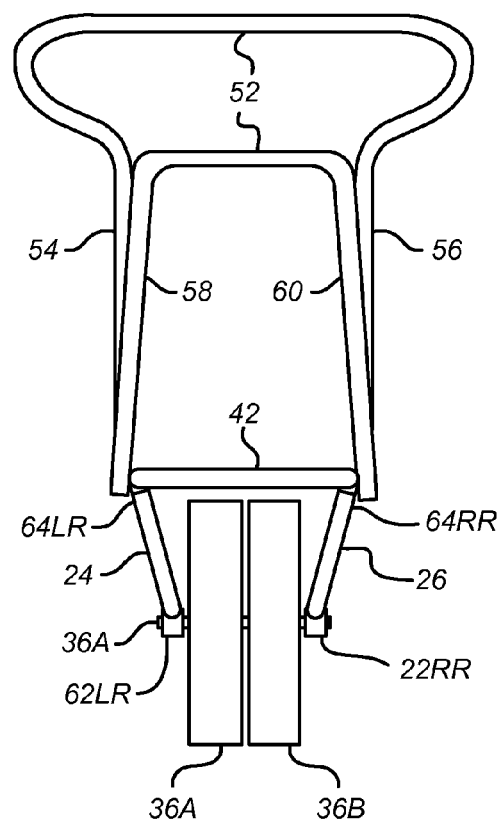
FIG. 6
FIG. 7

PORTABLE UTILITY TRANSPORT

NON-PROVISIONAL PATENT APPLICATION

This is a continuation of the non-provisional patent application Ser. No. 12/230,888 filed for on Sep. 6, 2008 now abandoned in conjunction with the provisional patent application No. 60/972,899 filed on Sep. 17, 2007, confirmation number 8621.

DRAWING

Figures

Figure 1:
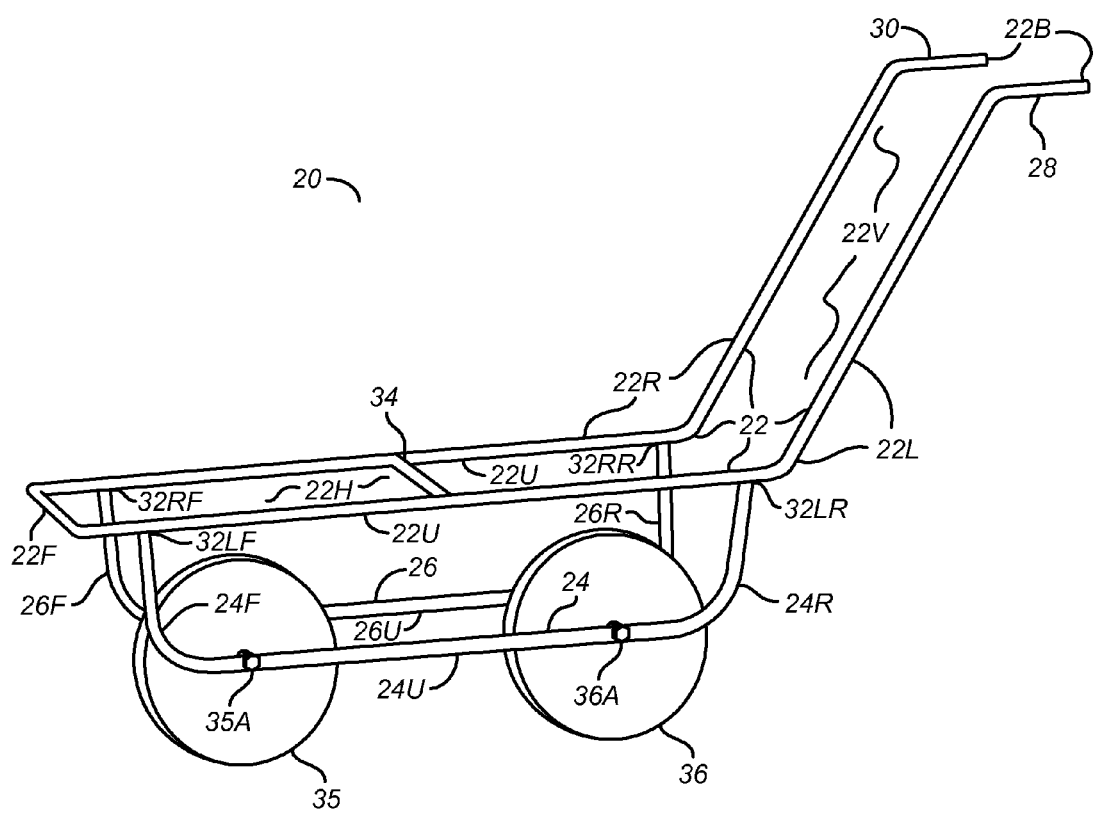

FIG. 1: Is an environmental perspective view illustrating a portable utility transport in its operative stance showing its features.

Figure 2:
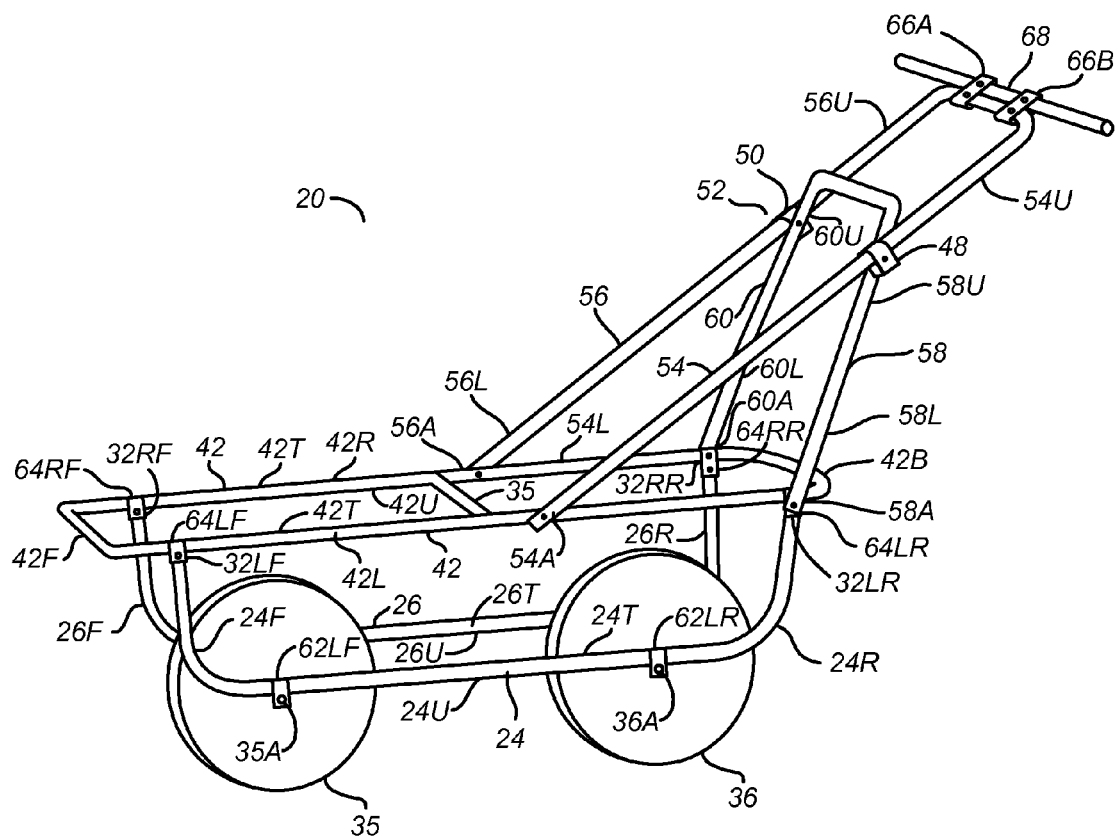

FIG. 2: Is a slightly different environmental view of the portable utility transport in its operative configuration showing more details.

Figure 3:
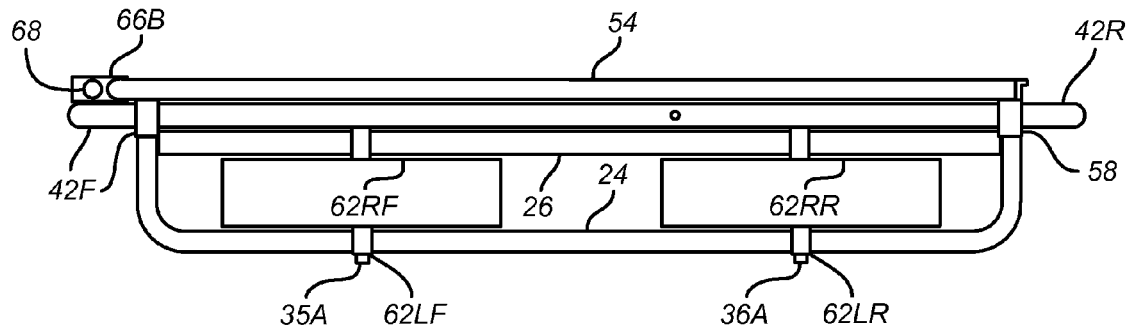

FIG. 3: Is a folded portable left side elevation of the portable utility transport.

Figure 4:
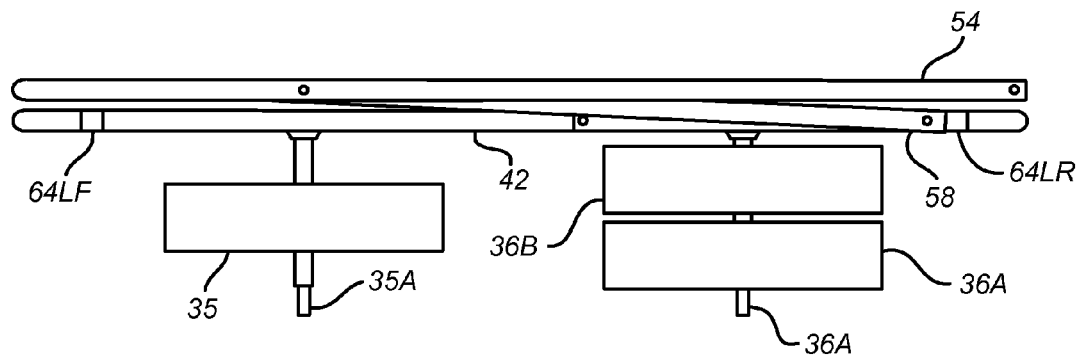

FIG. 4: Is a slightly different left side elevation of the three-wheeled portable utility transport.

Figure 5:
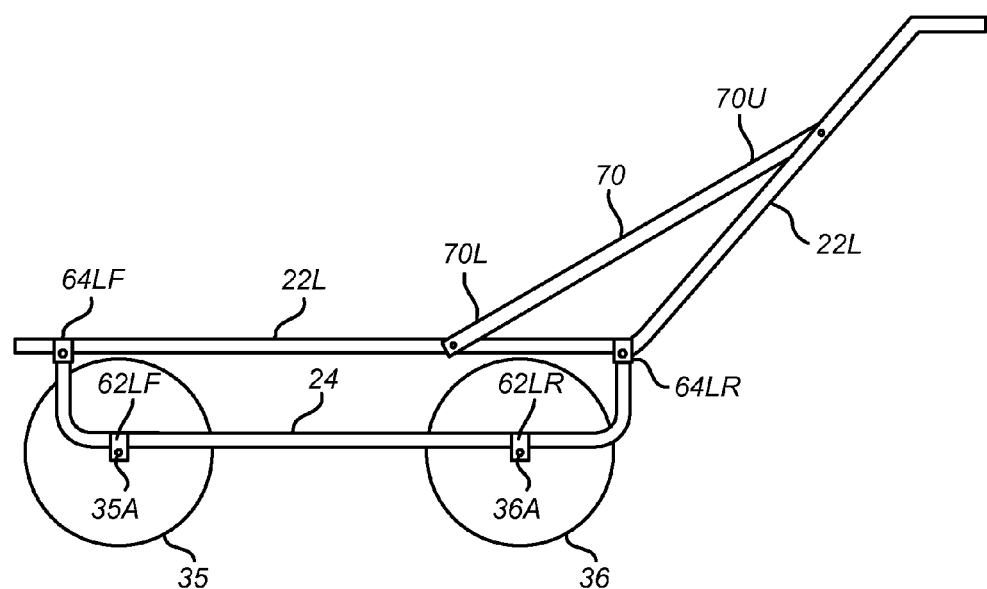

FIG. 5: Is a left side view elevation of the portable utility transport.

FIG. 6: Is a front view elevation of the portable utility transport.

FIG. 7: Is a rear view elevation of a three wheel version of the portable utility transport.

DETAILED DESCRIPTIONS OF THE

Preferred Embodiments

FIG. 1 Provides an environmental perspective view of the present portable utility transport in operation. The present transport of FIG. 1 essentially comprises a structure (20) comprising a carrier guidance frame (22) and a left (24) and right (26) undercarriage frame. The left (24) and right (26) undercarriage frames each have a forward arm (24F and 26F) and a rearward arm (24R and 26R) opposite the forward arm of predetermined length that extend approximately perpendicular and substantially parallel. The carrier guidance frame (22) has a forward end (22F) and a rearward end (22B) opposite the forward end (22F) as well as a left side (22L) and a right side (22R) opposite the left side (22L) and substantially parallel. The forward end (22F) laterally joins the left side (22L) and the right side (22R) of the carrier guidance frame (22). The carrier guidance frame (22) has a substantially horizontal carrier frame portion (22H) having an underside (22U) and a nearly vertical guidance frame portion (22V) that extends upward and rearward of a predetermined length providing a left handle (28) and a right handle (30). The left (24) and right (26) undercarriage frames and the forward (24F and 26F) and rearward (24R and 26R) arms thereof are positioned respectively below the left side (22L) and the right side (22R) of the carrier portion (22H) of the carrier guidance frame (22) being nearly parallel and longitudinal with points of attachment (32LF, 32RF, 32LR and 32RR) thereunder. Surface contact means (e.g. in-line or other wheeled sakes, ice skates, skis, wheels, etc.) extend below the left (24U) and right (26U) undercarriage frame.

FIG. 2 Provides an environmental perspective view of a second preferred embodiment. The carrier frame (42) has an underside (42U) and an upperside (42T) and a left side (42L) and a right side (42R) nearly parallel of a predetermined length and a forward end (42F) and a rearward end (42B) nearly parallel laterally joining the left side (42L) and the right side (42R) of the carrier frame (42). The guidance frame (52) has a leading strut on the left side (54) and on the right side (56) and a trailing strut on the left side (58) and on the right side (60) each strut having a lower end (54L, 56L, 58L and 60L respectively) and an upper end (54U, 56U, 58U and 60U respectively). Each upper end of the leading strut and the trailing strut of the left side (54 and 58 respectively) and the right side (56 and 60 respectively) are coupled together in substantially a vertical point of attachment (48 and 50 respectively) above the carrier frame (42). The leading strut of the left side (54) and the right side (56) have attachment points (54A and 56A respectively) positioned about midway between the forward end (42F) and the rearward end (42B) on their respective sides of the carrier frame (42). The lower end of the trailing strut of the left side (58L) and the right side (60L) have attachment points (58A and 60A respectively) near the rearward end (42B) on respective sides of the carrier frame (42). The leading strut of the left side (54) and right side (56) extend upward and rearward of predetermined length proving a left side handle (54H) and right side handle (56H). The upper end of the trailing strut of the left side (58U) and right side (650U) extend upward and are joined laterally. The left (24) and right (26) undercarriage frame have an underside (24U and 26U respectively) and an upperside (24T and 26T respectively) and each have a forward arm (24F and 26F) and a rearward arm (24R and 26R) of predetermined length that extend approximately perpendicular and substantially parallel. The left (24) and right (26) undercarriage frames and the forward (24F and 26F) and the rearward (24R and 26R) arms are positioned respectively below the left side (42L) and right side (42R) of the carrier frame (42) nearly parallel and longitudinal in orientation, having attachment points (32LF, 32RF, 32LR and 32RR respectively) thereunder. Surface contact means (e.g. in-line or other wheeled skates, ice skates, skis, wheels, etc.) extend below the underside of the left (24U) and right (26U) undercarriage frame. The portable utility transport may include at least one lateral support (34) joining the left side (22L) and right side (22B) of the carrier frame (22). The separate left handle (28) and right handle (30) are joined creating a continuous lateral handle. A handle bar (68) is fastened (e.g. bolt screw welded) soldered, brazed, etc.) to the left (28) and right (30) handle of the carrier guidance frame (22). A removable handle bar (68) mounting is achieved by attaching fittings brackets etc. (64A and 64B) to the rearward end of the guidance frame (22B) that have passages slightly larger than the handle bar (68) permitting the handle bar (68) to pass through the passages and removeably locked in a place (e.g. screw. Bolt, clamped, pinned bias spring pin etc.). FIG. 5 A left and a right strut (70 and 72 not shown on prints) are attached (e.g. welded, brazed, soldered, bolted, etc.) carrier guidance frame (22). The upper ends (70U and 72U not shown on prints) of the struts on their respective side are attached to the rearward end (22B) of the vertical portion (22V) of the carrier guidance frame (22) and the lower ends (70L and 72L not shown on prints) are attached approximately mid-way along the carrier portion (22H) of the carrier (22). The wheeled embodiment of the present transport exemplified in the drawings have a forward wheel (35) and a rearward wheel (36) positioned between the left (24) and right (26) undercarriage frame with insertable axles (35A and 36A respectively). The wheels (35 and 36) extend below the undercarriage frames (24U and 26U) and the axles (35A and 36A) are laterally attached to opposite undercarriage frames (24 and 26) and laterally opposed holes, apertures, passages are located in the undercarriage frames (24 and 26).

The axles (35A and 36A) pass through passages on either side of the undercarriage frame (24 or 26) then through the central passage of the wheel (35 or 36) then through the opposite passage of the opposing undercarriage frame (24 or 26). Common fasteners may be used (nuts, bolts, screws, cotter pins, etc.) to retain the axles (35A and 36A0 in their assembled position. By reversing this procedure the wheels may be dislodged from the undercarriages (24 and 26). A forward wheel (35) and a rearward wheel (36) positioned between the left (24) and right (26) undercarriage frame with insertable axles (35A and 36A). The wheels (35 and 36) extend below the undercarriage frames (24U and 26U) and the axles (35A and 36A) are laterally attached to opposite sides of the undercarriage (24 and 26). Laterally opposed axle fittings (62LF, 62RF, 62LR and 62RR) are retained on the undercarriage frames (24 and 26) either fixed position (e.g. welded, brazed, soldered, etc.) or repositionally secured (e.g. clamped, bolted screwed, pinned, bias spring pin, etc.) to the undercarriage (24 and 26). The fittings have a passage or aperture hole slightly larger than the undercarriage frame if a repositioned use is desired. A perpendicular second passage adjacent to the first slightly larger passage receives the axles (35A and 36A) in the fittings (63LF, 62RF, 62LR, and 62RR) of the wheels (35 and 36). The fittings (63LF, 62RF, 62LR, and 62RR) may be moved forward or rearward on the undercarriage (24 and 26) increasing or decreasing the wheelbase of the structure (20). The rear fittings (62LR and 62RR) can be moved closer to the center of the carrier frame (42) and closer to the load center of gravity simplifying a tipping rearward of the structure (20) in order to roll over any obstacle. In a different application the front fittings (62 LF and 62RF) are moved closer to the center of the carrier frame (42) simplifying a tilting forward of the structure (20). The elongated guidance frame acts as a lever over front or rear wheels (35 or 36). The under carriage arms (24F, 26F, 24R, and 26R) are secured to fittings (32LF, 32RF, 32LR, and 32RR respectively) that are retained on the carrier frame (42) either in a fixed position (e.g. welded, brazed, soldered, etc.) or repositionably secured (e.g. clamped, bolted, screwed, pinned, bias spring pin, etc.). The fittings (32LF, 32RF, 32LR, and 32RR) have a passage slightly larger than the carrier frame if a repositional use is desired. A perpendicular second passage terminating at the first passage retains the arms (24F, 26F, 24R, and 26R) of the undercarriage (24 and 26). The undercarriages (24 and 26) in the repositional use application of the fittings (32LF, 32RF, 32LR, and 32RR) permit the undercarriage (24 and 26) to pivot about the carrier frame (42). The upper end (54U and 56U) of the leading struts (54 and 56) of the guidance frame (52) are laterally joined creating a continuous lateral handle. A handle bar (68) is fastened (e.g. bolt, screw, welded, soldered, brazed, etc.) to the left and right upper end of the leading strut (54U and 56U). A removable handle bar mounting is achieved by attaching fittings, brackets (66A and 66B) to the upper end of the leading struts (54U and 56U) that have passages slightly larger than the handle bar (68) permitting the handle bar (68) to pass through the passages and be removably locked in place (e.g. screw, bolt, clamped, bias spring pin, etc.). At Least one lateral support (35) may be attached (e.g. welded, brazed, soldered, screwed, etc.) to the left side (42L) and right side (42R) of the carrier frame (42).

Operations:

A human stands behind the rearward end facing the portable utility transport and grasps the handle (68A) or handles (28 and 30) of the guidance frame (52) and pushes forward. The transport is steered by pushing down on the elongated guidance frame (52). Thereby raising the front wheel (35) off the contact surface and pivoting the structure (20) at the surface contact point of the rear wheel (36). The elevated height of the front wheel may be controlled by the amount of downward force applied to the elongated guidance frame (52) enabling the structure (20) to roll the rear wheel (36) against an object then by raising the guidance frame (52) allowing the wheels (35 and 36) too roll to the opposite side of the obstacle back to the contact surface. The removable axles (35A and 36A) are dislodged allowing the undercarriage frames (24 and 26) to pivot at their attachment fittings that are pivotally attached to the carrier frame (22 or 42).

The under carriage (24 and 26) rest adjacent to the underside of the carrier frame (22 or 42) in a stowed configuration. The leading struts (54 and 56) are dislodged from their lower points of attachment (54A and 56A) allowing the guidance frame (52) to pivot at the vertical point of attachment (48 and 50) to nearly parallel with the trailing struts; thus pivoting the entire guidance frame (52) assembly forward at the trailing strut attachment points (58 and 60) lying virtually flat upon the carrier frame (42). The transport may be constructed of ferrous or non-ferrous metal, plastic, fiberglass, wood or a combination thereof. etc. Oval tubular stock has been depicted throughout the drawings, but other geometric cross section material could be applied. The transport has been illustrated in the drawing figures with wheels. Alternately it may be equipped with virtually any conventional type of either rolling or sliding surface contact means (e.g. in-line or other wheeled skates, ice skates, skis, etc.). Alternately it may be applied to any low friction surface contact means allowing it to travel over a surface with minimal friction. The transport is capable of supporting and transporting a person lying down, harvested game, etc.

I claim:
1. A portable utility transport comprising:
   a carrier guidance frame;
   a left undercarriage frame;
   a right undercarriage frame;
   a first wheel connected between said left undercarriage frame and said right undercarriage frame using a first axle, wherein said first axle passes through a central passage of said first wheel;
   a second wheel connected between said left undercarriage frame and said right undercarriage frame using a second axle, wherein (i) said second axle passes through a central passage of said second wheel and (ii) said first axle and said second axle are moveably connected to said left and right undercarriage frame to vary the length of said left undercarriage frame and said right undercarriage frame exposed between said first wheel and said second wheel to adjust a center of gravity of said portable utility transport;
   said left undercarriage frame and said right undercarriage frame each having a forward arm and a rearward arm opposite said forward arm;
   said carrier guidance frame having (i) a forward end and a rearward end and (ii) a left side and a right side parallel to said left side;
   said forward end of said carrier guidance frame is laterally joined to said left side and said right side of said carrier guidance frame;
   said carrier guidance frame having a handle portion that extends upward and forms a left handle and a right handle; and
   said left undercarriage frame and said right undercarriage frame (i) positioned respectively below said left side and said right side of said carrier guidance frame and (ii) having points of attachment on said carrier guidance frame.

2. The portable utility transport according to claim 1, further comprising:
at least one lateral support joining said left side and said right side of said carrier guidance frame.

3. The portable utility transport according to claim 1, wherein said first wheel and said second wheel (i) are below said carrier guidance frame and (ii) extend below said left and said right undercarriage frames.

4. The portable utility transport according to claim 1, further comprising:
an aperture and a fastener to attach said arms of said left and said right undercarriage frames to said points of attachment on said carrier guidance frame.

5. The portable utility transport according to claim 1, wherein said left handle and said right handle are joined together creating a continuous lateral handle and a removable handlebar is mounted to said continuous lateral handle.

6. The portable utility transport according to claim 1, further comprising:
a left side and a right side strut having (i) a lower end with an attachment point approximately midway along said left side and said right side of said carrier guidance frame and (ii) an upper end of said left side and said right side strut with an attachment point near said rearward end respectively on said left side and said right side of said carrier guidance frame.

7. The portable utility transport according to claim 1, wherein said portable utility transport comprises three wheels connected between said left undercarriage frame and said right undercarriage frame.

8. The portable utility transport according to claim 1, wherein said forward arm of said left undercarriage frame and said forward arm of said right undercarriage frame extend in front of said first wheel and said second wheel.

9. The portable utility transport according to claim 1, wherein adjusting said center of gravity of said portable utility transport helps said portable utility transport roll over an obstacle.

10. An apparatus comprising:
a carrier guidance frame having a length and a width, wherein said width is shorter than said length;
a left undercarriage frame having a top portion and a bottom portion, wherein (i) said left undercarriage frame is below said carrier guidance frame and (ii) said top portion of said left undercarriage frame is attached to said carrier guidance frame;
a right undercarriage frame having a top portion and a bottom portion, wherein (i) said right undercarriage frame is below said carrier guidance frame and (ii) said top portion of said right undercarriage frame is attached to said carrier guidance frame;
a first axle having a length, wherein (i) said length of said first axle is shorter than said width of said carrier guidance frame, (ii) said first axle is below said carrier guidance frame and (iii) said first axle is connected between said bottom portion of said left undercarriage frame and said bottom portion of said right undercarriage frame;
a second axle having a length, wherein (i) said length of said second axle is shorter than said width of said carrier guidance frame, (ii) said second axle is below said carrier guidance frame and (iii) said second axle is connected between said bottom portion of said left undercarriage frame and said bottom portion of said right undercarriage frame;
a first wheel attached to said first axle, wherein (i) said first wheel is located between said left undercarriage frame and said right undercarriage frame and (ii) said first axle passes through a central passage of said first wheel; and
a second wheel attached to said second axle, wherein (i) said second wheel is located (a) between said left undercarriage frame and said right undercarriage frame and (b) in line with said first wheel, (ii) said second axle passes through a central passage of said second wheel and (iii) said first wheel and said second wheel are moveably connected to said left and right undercarriage frame to vary the length of said left undercarriage frame and said right undercarriage frame exposed between said first wheel and said second wheel to adjust a center of gravity of said apparatus.

11. The apparatus according to claim 10, further comprising:
at least one lateral support joining the left side and the right side of said carrier guidance frame.

12. The apparatus according to claim 10, wherein said first axle and said second axle have lateral attachment points on opposite sides of said left undercarriage frame and said right undercarriage frame.

13. The apparatus according to claim 10, wherein said first wheel and said second wheel extend below said left undercarriage frame and said right undercarriage frame.

14. The apparatus according to claim 10 further comprising:
an aperture and a fastener to attach said left and said right undercarriage frames at points of attachment on said carrier guidance frame.

15. The apparatus according to claim 10 further comprising:
at least two lateral supports joining the left side and the right side of said carrier guidance frame.

16. The apparatus according to claim 10, wherein a leading strut comprises (i) a lower end attached to said carrier guidance frame and (ii) an upper end forming handles.

17. The apparatus according to claim 10, wherein adjusting said center of gravity of said apparatus helps said apparatus roll over an obstacle.

18. The apparatus according to claim 16, wherein said upper end of said leading strut of said guidance frame is joined together creating a continuous lateral handle and a removable handlebar is mounted to said continuous lateral handle.

19. The apparatus according to claim 16, wherein a trailing strut comprises (i) a lower end attached to said carrier guidance frame and (ii) an upper end coupled to said leading strut.

* * * * *